Mar. 6, 1923.    W. W. CARSON    1,447,279

MEANS EMPLOYED IN THE ART OF KEEPING FAMILY RECORDS

Filed May 12, 1919

Fig. 1

Fig. 2

WITNESSES:
Chas. E. Ferris
Chas. H. Perkins

INVENTOR
William Waller Carson

Patented Mar. 6, 1923.

1,447,279

UNITED STATES PATENT OFFICE.

WILLIAM WALLER CARSON, OF KNOXVILLE, TENNESSEE.

MEANS EMPLOYED IN THE ART OF KEEPING FAMILY RECORDS.

Application filed May 12, 1919. Serial No. 296,690.

*To all whom it may concern:*

Be it known that I, WILLIAM WALLER CARSON, a citizen of the United States, residing at Knoxville, in the county of Knox and State of Tennessee, have invented a new and useful Improvement in Means Employed in the Art of Keeping Family Records.

The word Family as here used by me includes every individual of every generation, past, present and future, who is kin to either the husband, the wife, or both. In other words it refers to all generations and includes all ancestors, all descendants, and all collaterals, of the given husband or wife or both.

The words Husband and Wife, as here used by me, refer to any two mated individuals of opposite sex whether of the vegetable or the animal kingdom, and this in spite of the fact that for brevity, and as the most familiar of types, I shall speak hereafter as if they were human beings.

When I speak of two individuals as being Kin I mean that they have a common ancestor. When I speak of them as Collaterals I mean that they are kin but that neither is an ancestor of the other.

My invention will greatly facilitate the study and application of the doctrines of heredity. It will thus facilitate investigations in plant and animal life, and help to solve innumerable problems in the breeding of plants and animals. In like manner it will be of great help in the study of sociology, as heredity records hitherto well nigh impossible may now be made of numberless facts relating to disease, insanity, criminology, mentality, and whatever has to do with the human body, mind or morals. But it will be used most frequently by those who have more or less family pride, by those who would identify and rescue their kin from oblivion by recording their names and the prominent features of their lives.

Numerous efforts, sometimes graphical sometimes analytical, have been made to meet the needs of this last situation, but the efforts have always broken down. The problem was too vast to be handled graphically, and the analytical methods proposed invariably lacked vision and comprehensiveness and anything well thought out in the way of a plan or system.

My invention rests on two main features: its system of symbols, and its method of tabulation, including its references.

In daily life we constantly designate an individual by naming his office or the place he fills, as the judge, the colonel, the plaintiff, etc., and so leave it to the context to show whether the reference is really to the place or to the person. The double meaning thus given to the words contributes much to brevity. And despite the lack of verbal accuracy, the custom is free from objection in cases where the context makes the meaning plain. So in such cases I will follow the custom both in this specification and in the claims that are to follow. In daily life it is conceivable that certain ambiguities might arise from this custom seeing that there may for example, be several regiments—each with its own colonel, and that promotions also bring different men in succession to the head of the regiment. But nothing analogous can ever occur in my case, for I never give the same name (symbol) to two different places; nor can two individuals ever hold the same place in the family tree of a given husband and wife. Thus no two individuals can be the great great grandfather to the given wife, the lines being all paternal; nor can the given husband have more than one first born uncle on his mother's side. So I designate any particular kinsman of the given husband or wife by expressing (by means of a symbol) his kinship—his place in the family tree.

Now for each place on this family tree (though some are never filled) I have a symbol, different from all other symbols, which accurately locates and defines that place and distinguishes it from all other places, and hence its occupant from all other individuals. Thus to designate any particular kinsman I have only to name the symbol for his place.

My complete symbol for such a place, even when abbreviated, answers to the coordinates of a point in geometry in that it is in fact a compact and explicit formula, or set of directions, for passing from the chosen origin to that particular place. Now I make such a trip by a succession of uniform steps each equal in length to the distance between parent and child. Thus my symbol for any place is simply an exhibit of the number of steps needed to reach it and of the direction of each. My path is always along a family blood stream, up when the stream is ancestral but down when collateral. And, as I take the origin at a kinsman's place, each step ends at some other kinsman's place. Hence, for any proposed trip, a memorandum of these successive endings is at once an announcement of the total number of steps to be taken and of the direction of each. Such a memorandum therefore is my symbol for any kinsman's place. It evidently includes the destination but not the point of departure. This last is called the origin and must, of course, be announced in advance. Thus, one of my symbols, being an explicit set of directions for making a certain trip, inevitably points to one place only, and so designates one individual only—the sole possible occupant of that place. But while one individual fills but one place in general, he may in abnormal cases fill two or even more. Thus, since each place has its own symbol, the same individual may be designated sometimes by two different symbols or even more. For example, if among the ancestors of the origin, any husband and wife are kin to each other any common ancestor of theirs, being separately related to each, occupies two places (sometimes more, depending on the kinship). Similarly a collateral will occupy two, or even more, places if descended from a pair of parents kin to each other through the family blood (see further on). In all cases the occupant of several different places is pointed to by as many different symbols. This indicates abnormal marriages, easy of location, among his kin—between his descendants in the ancestral lines if he is of such a line, but between his progenitors if he is a collateral.

So far I have spoken here and there perhaps with needless accuracy. But hereafter I will not multiply words for the sake of verbal accuracy when the context makes it plain enough whether the real reference is to a place or to its occupant. Indeed these last are so linked together not only in fact but also in human thought and mode of speech that, to avoid prolixity, it will be necessary to speak sometimes in terms of the one and sometimes of the other and to consider them as equally represented by the same symbol. All of this I will do. Every strain of the family blood reaches the given husband or the wife but usually not both. But all reach their children. Hence I take a child of theirs as the origin so as to locate the latter on every blood stream. By my method I can keep accurate count of all such blood streams and their collateral branches, and assign a separate symbol to every place on every such stream or branch. But I have no symbols for places on other blood, nor do I keep count of anything not of the family. As stated, I take the origin at a child, but this child is preferably hypothetical for the double reason that the given husband and wife may be childless, and that the origin should be without descendants— this last so that the entire family, looked at as pertaining to the origin, may consist of two classes only, ancestors and collaterals.

That my symbols may be compact I need a short name for a kinsman's place. Hence to every such place I assign, according to certain principles, a partial symbol analogous to the Christian name—a letter for a collateral's, a number for an ancestor's. A memorandum in sequence of the partial symbols for the places terminating the successive steps taken in passing from the origin to any particular place (that for the latter included) is my complete symbol for that particular place. This symbol therefore, as will be seen hereafter, is a succession of numbers alone or of numbers followed by letters. How I abbreviate it without loss of precision will be shown further on.

I will now set forth the principles, or rather conventions, whereby I determine the partial symbols to be assigned. Though I use letters for collaterals, as stated above, it will be seen that I also use a letter for an ancestor when enumerating him with the group of brothers and sisters to which he belongs. Thus for kinsmen in general, including an ancestor when enumerated as above, I use letters as follows:

$a$—I letter alphabetically in order of birth the children of every kinsman by every marriage, the first letter going to the first child of the marriage. Thus a kinsman several times married may have several children lettered alike. But I score the kinsman's own letter differently for the different sets of children, as further on. I use an upper case letter (capital) for a child of one sex, say the male, and a lower case letter (small) for a child of the other sex. Also, for fear of ambiguous writing, for the one sex I overscore the letter and for the other sex I underscore it. If a kinsman marries several times I use as many scores with his letter on any occasion as the number of his marriage implied by that occasion. Thus I use three scores with a kinsman's letter on occasions implying children by a third marriage but only two scores on occasions implying children by a second marriage.

I am aware that others have applied to a kinsman a partial symbol — sometimes a letter, sometimes a number — which shows, but only shows, his numerical rank among the children of one of his parents. But, as just seen, the partial symbol applied by me is a letter (though a scored number would do quite as well save that it would not be always uniform with convention $c$ for ancestors, further on, by being odd for one sex and even for the other) which shows the kinsman's numerical rank among the children (not of a parent but) of a marriage. For it should be noted that the fifth (say) child of a parent may be only the second (say) child of the marriage. Again my symbol shows (by being under or overscored) the sex of the kinsman and (by the number of such scores) which marriage of said kinsman is implied by the occasion. Thus my symbol (whether a scored letter or a scored number) may not only differ widely from that of others in its count, but it is always more detailed and explicit.

But for ancestors as such I use only numbers. Thus:

$b$—Let 0 denote the origin — the hypothetical child.

$c$—Let an odd number denote an individual of one sex (say the male) and an even number one of the other sex.

$d$—Let the number of one parent (say the father) be 1 greater than twice the number of his child.

$e$—Let the number of the other parent be 1 greater than the number of the parent first referred to.

Corollary. A child's number is one half the even number next below either parent's number.

The last four conventions assign a special number to every ancestor and they give every number a definite assignment. This may be demonstrated by mathematics but it is easier to see it by visualizing a mental proceeding. Thus write down on the ground in a long row the unlimited scale of common numbers, 0, 1, 2, 3 etc. Summon the ancestors in pairs, a husband and wife together, and let each pair as called, take position on the lowest pair of numbers then vacant, one sex (as the male) always taking the odd number. Put the origin at 0 and call his parents (the given husband and wife) to take (1 and 2) the first pair of numbers. Call the parents of 1 to take (3 and 4) the next pair; the parents of 2 to take (5 and 6), the parents of 3 to take (7 and 8), and so on indefinitely. This process evidently assigns to every ancestor the very number assigned him by my conventions. Hence, since the process uses all the numbers, and again since it uses all the ancestors, classifying the latter by generations and arranging the individuals of each generation in the same definite order as it arranged the children, it is easy to see that the conventions do the same. Thus it is seen that conventions $b$, $c$, $d$, and $e$, just referred to, give a real structure — a symmetrical and well developed ancestral tree, in fact — on which I hang, so to speak, in successive generations, each arranged in the same most natural and systematic order, the names of all the ancestors of any given husband and wife.

Similarly it is seen that these conventions together with convention $a$, give another real structure — a symmetrical and well developed family tree, in fact, consisting of the above ancestral tree with pendant branches of collaterals added.

Having thus shown how I determine the partial symbols for the various kinsmen I will next show how I determine their complete symbols. I begin with the ancestors. I easily visualize the ancestral part of the family tree by supposing time and blood streams to reverse their flow. Thus the origin puts forth two parents. Each of these puts forth two; and so on continually. By repeated use of $d$ and $e$ I easily determine and apply each ancestor's number, that is his partial symbol. Now, supposing time and blood to have resumed their normal flow and that I set out from the origin to reach a given ancestor, I go up the blood stream, of course. From each junction point (ancestor) reached two others (his father and his mother) become visible. That one is my next objective which lies on the tributary I must ascend to reach my goal. Thus the complete symbol (answering to the full name) for any given ancestor's place is a series of numbers which I readily compile step by step. For, as seen above, it is but a memorandum of the just determined partial symbols for the termini of the successive steps to be taken in passing along the blood stream from the origin to the said given ancestor's place, the latter inclusive.

I come now to the collaterals. I easily visualize a portion of the collateral part of the family tree by remembering that to a pair of parents of the ancestral stream (or to either one if married more than once) children may be born in addition to the one in the ancestral line, and to these other children, and so on continually. I keep no count of the new blood brought in by the marriages of these children. I follow only the blood of the original family,—blood from streams that reach the origin.

Now, to compile the complete symbol for a given collateral, I set out from the origin, ascend the proper ancestral stream to the efflux point and then descend the collateral stream, all by a series of equal steps each terminating at a kinsman's place. In descending I am of course always careful to step from a parent to that particular child of his through whom flows that rivulet from the family blood which finally reaches my goal, i. e., the given collateral. Thus the complete symbol for any given collateral's place—the memorandum of the partial symbols for the termini of the steps taken in passing along the blood stream from the origin to the given collateral (the latter inclusive)—is a series of numbers followed by a series of letters. It contains as many numbers as there are generations between origin and efflux point (the latter inclusive)

and as many letters as there are generations between efflux point and the given collateral (the latter inclusive). For remote generations it is long. But in every case I abbreviate the numerical part (see below) by writing only the last number of the series. And as collaterals more than two or three generations removed from the ancestral stream are generally ignored the symbols really used will consist of a single number followed by one, two or even three letters, but seldom more.

Example 1. To find the symbol for the given husband's grandmother: Setting out from the origin I reach by successive steps 1 (given husband by $d$), 4 (his mother by $d$ and $e$), 10 (her mother by $d$ and $e$), which record becomes after omitting explanations, 1, 4, 10.

This is the complete symbol for this grandmother. But I abbreviate it (as all other complete symbols for ancestors) and definitely locate the place by giving the last number only. For, here as elsewhere, it is easily seen that the entire succession of numbers may be written out backwards from the last number by a repeated use of the corollary pointed out above.

Example 2. To find who 25 stands for. The complete symbol, instructions for the trip, see corollary, is 2, 5, 12, 25. Or, inserting explanations, 2 (the given wife, by $d$ and $e$), 5 (her father, by $d$), 12 (his mother, by $d$ and $e$), 25 (her father, by $d$). Thus 25 is the father of the given wife's paternal grandmother.

Example 3. To find the symbol for the given wife's maternal grandfather's third (a female) child's second (a male) child by her third marriage. We easily write out the following record of the trip, 2 (given wife), 6 (her mother), 13 (maternal grandfather—the efflux point, C (third child, female, third marriage), B (second child, male). Thus the symbol becomes, after abbreviating the numerical part of the record, 13 C $\bar{\text{B}}$.

The last example suggests the need of an additional convention. For a collateral branch may leave the ancestral stream through one parent (in case of plural marriage) or through a pair of parents — the latter being perhaps the most common. Thus I have the following: Convention, let a score under an odd number stand for the words and the next higher number also, and a score over an even number for the words and the next lower number also. Thus either $\underline{13}$ or $\overline{14}$ stands for 13 and 14. of which abbreviations I will generally use the first. Now if the collateral branch in the last example had left the ancestral stream through the grandmother (instead of the grandfather, as announced) the collateral's symbol would have been 14 C $\bar{\text{B}}$; if through both it would generally be written 13 C $\bar{\text{B}}$; but if I want to bring out the fact that this was the first, say, of several marriages of this grandmother I would write it $\overline{14}$ C $\bar{\text{B}}$.

Before dismissing the subject of symbols I must say something about surnames — this with special reference to collaterals and their tabulation.

It is easy to see that I really make the symbol for any collateral by simply annexing the partial symbol (answering to Christian name) for that collateral to the symbol of his parent, either complete or abbreviated. But notice that this parent, whether male or female (or even both, as in a few lines back), can have no symbol unless of the family blood. The parent's symbol therefore (whatever it may be, and without reference to his sex) answers to the surname for each and every one of his children. But this surname, being somewhat differently scored for different marriages, will not be exactly the same for children by different marriages. Now in tabulating collaterals I try to put the children of the same individual together, each with his symbol attached; though often the children of several individuals will be gotten on the same page. But the several groups of children will easily be distinguished and identified by the surnames.

In the breeding of plants and beasts the order of birth and the number of the mating are apt to be unknown and of no interest. In such cases, to avoid the use of symbols which would probably be erroneous, I use as the partial symbol for every child and on every occasion some one letter as X from the proper case with a single score to show the sex.

My method of tabulation, including its references, is shown in the accompanying drawing.

Figure 1 shows my table for ancestors with several entries, and Fig. 2 shows my table with several entries for kinsmen in general or, as I say more briefly, for collaterals. Each table covers both pages of the open book and extends over as many succeeding pages as may be necessary. The double vertical line X is the middle of the double page, i. e., it is in the back, the hinge or line about which the leaves of the book turn. I speak of a book. For, though it is possible to keep the family records on detached sheets, it is better to keep them in a book. As will be seen my two tables are identical in their rulings and headings except in this—that there are no heavy rulings to separate the generations in Fig. 2 and that the first column in Fig. 2 headed "Symbol" is subdivided in Fig. 1 into three columns headed "Father," "Symbol," "Child".

The fact that the collateral symbol is usually much wider than that for an ancestor makes this possible. And these additional columns though unneeded where collateral symbols are used, are of great use where ancestral symbols are used, since these last would otherwise call for mental calculations (with risk of mistake) in passing up or down through the generations.

I should say that, in using my tables, I personally prefer that method of entry common in railroad transit books, which numbers or letters its lines from the bottom towards the top of the page, but that in deference to popular taste I use the contrary method in the drawing.

Lack of space in the drawing causes me to make all the columns narrower, some of them considerably narrower, than experience shows to be desirable. Moreover lack of space compels me to make a large excision from each table, say, from the right hand page in Fig. 1 and from the left hand page in Fig. 2. However, as the parts cut from one table are identical with corresponding parts left in the other it is easy to see from one table what the excision took from the other. Of course my books come from the manufacturer with tables ruled and printed ready for the entries as shown in Figs. 1 and 2. But if a book already so prepared is not at hand I easily prepare one as follows. I rule the tables and head the columns by hand as shown in Figs. 1 and 2, and I number the lines of Fig. 1 in succession as shown in the drawing and over as many pages as may be needed. This numbering should be carefully noted. Thus in the column headed "Father" is the series of odd numbers beginning with 3. In the column headed "Symbol" is the series of natural numbers beginning with 1. In the column headed "Child" is the duplicated series of natural numbers beginning with 0; that is, each number of the natural series is written on two consecutive lines; or, better still, the alternate lines are dittoed or left blank as shown in Fig. 1. As a check it should be noted that the three numbers on any line must conform to $d$ and $e$, that is to the Corollary. All these numbers are, alike, both the partial and the complete though abbreviated symbols for individuals.

In Fig. 1 the numbers in the column headed "Symbol" are the symbols for the various ancestors, and hence set apart to each ancestor in advance his particular line. The numbers in the other two columns are to facilitate the use of the table. Thus any number in the column headed "Father" is, in fact, the symbol for the father of the ancestor in whose line that number appears. Hence any ancestor's father may be seen and turned to at once; or the mother may be seen if (see $e$) the number in the father's column be increased mentally by one. Indeed such an increase of all the numbers of the father's column would convert it into a mother's column, whose numbers are the series of even numbers commencing with 4. It is evident that such a column would serve my purpose just as well as the other but that only one is needed.

Similarly any number (whether actually placed or simply implied by a ditto or a blank) in the column headed "Child" is in fact the symbol for the child of the ancestor in whose line that number appears. Hence the said ancestor's child may be turned to at once. It is evident that either the column headed "Father" or that headed "Child," or both, could be omitted but at considerable loss of convenience.

Since ancestors are necessarily definite as to number, sex, and order, I can, as above, assign to each ancestor his line in advance. But the case is not so for collaterals since families are not the same as to number, sex and order of birth. Thus, in using a table for collaterals I have to assign to each individual his proper line as I insert the entries. I should say that I do not rule the whole book for the tables, but that I leave quite half of it for the biographical sketches.

Having thus shown how my tables are prepared, it only remains to show how I enter the records, although an inspection of the drawing may already have made this plain enough. It is necessary to enter names in the table of ancestors before they are entered in the table of collaterals. In other respects the entries in the two tables may proceed according to the convenience or whim of the recorder. All names, Christian, middle, and surname, I carefully spell out in full. I use a woman's maiden name only and never attach her husband's name to it.

To fill out the table of ancestors I notice (see $b$, $d$ and $e$) that 1 is the number of the given husband and 2 of the given wife. So I enter the name of the given husband (possibly not yet married) in the proper line and column. But if his name should be unknown (for a book may be prepared for a little boy or girl and the spouse's kin entered in later years) I enter the given wife's name in her proper line and column. In either case I next enter in order on lines already set apart to them by their symbols, all known ancestors bearing the surname already entered. Thus if the given husband's name was entered I see, in the proper column and on his line that his father's number is 3, so I enter this father's name on line 3. Similarly I see that the father of the last is 7, so I enter his name on line 7, and so on until all known ancestors of this line and surname have been entered. This being done (or without doing it if the given husband is unknown) I now enter the name of the given wife (if known) in line 2. Then, as before, I see that her father is 5, and so on. Thus as before, I enter all known ancestors of that line and surname in their proper lines. And, in general, after entering all known males of one line and surname I proceed as follows repeatedly. To the husband of the lowest number not already supplied I supply, on her proper line, the name of his wife, and then enter, as shown above, the names of her father, grandfather, etc., that is of all bearing her surname. I repeat this process continually, always commencing by supplying the wife to the husband of lowest number not already supplied, and entering next the names of her male ancestors of her surname. I thus deal with the same surname as long as possible so as to avoid the risk of mistake due to frequent changes. The dates, children, etc., and the prominent features of the life, I insert at such times and in such order as I find most convenient. When any individual's biography, possibly extending over many pages, has been written I enter on his line and in the column headed "Biog." the number of its initial page. I enter the number of his children, males above, females below, in the children's column sub-headed "No." And in their column sub-headed "Page" I enter the number of the page on which (in the table of collaterals) I enumerate the children, apply their symbols, and describe them, as above, For a more detailed explanation let John Jones and Mary Kyle be the given husband and wife. I enter them (Fig. 1) on lines 1 and 2 with dates, putting date of marriage on the husband's line. I do not enter the date of the husband's death for, though old, he is still living. As seen, their biographies are to be found on pages 118 and 119 respectively. Their children were two sons and one daughter whom I enumerate and describe on page 65 (see Fig. 2) where I apply their symbols. From the entries I there make, and here quote in part, the following facts appear:

1A Alfred Jones, oldest child, a son.

1B Roy Jones, second child, a son.

1c Mary Jones, third child, a daughter.

Alfred's only marriage was to Mary Rogers. Their biographies are both given on page 120. They had one son and one daughter who are enumerated on page 67.

Roy (biography on page 153) was married first to Anna Racy (biog. p. 155) by whom he had three daughters (enumerated on page 67). Later he married Mary Hyder, (biography on p. 156).

Mary Jones (biog. p. 211) married Harper (biog. p. 208) by whom she had three sons and four daughters (enumerated on page 83).

I always enter a husband and wife together—the wife's line after that of her husband. In the case of a collateral I connect the two lines with a brace (Fig. 2) to show the marriage, for the spouse of a collateral has no symbol. For an ancestor as such there can be but one marriage. But for a collateral (including any ancestor) there may be several marriages. I place each later spouse on the line adjacent to that of the preceding one and lengthen the brace to take in the entire family. The date and the children of any marriage I ordinarily enter in the husband's line. But if the latter is a collateral who married several times I enter the date and the numbers of the children on the lines of the wives to whom they pertain. All of this is shown in Fig. 2. In the collateral table, on any page where I find just room enough (this to economize space) I enter in order of birth the children of any kinsman leaving room for their spouses and separating them into groups if they come of different marriages. But in the ancestral table the line for each ancestor is assigned in advance as already pointed out.

It has been seen that my abbreviated symbols for ancestors as such are numbers, the larger numbers going to those more remote from the origin. The effect of this, though I do not stop to demonstrate it, is to classify the ancestors in my table according to their generations. Now, as an aid to the eye, I use an extra heavy ruling to separate the line on which one generation ends from the line on which the next generation begins. Thus (see convention $d$) the rulings are extra heavy before the lines numbered 1, 3, 7, 15, 31, 63, 127, 255, and so on, of which the first three are shown in Fig. 1. It will be seen in the specification and description which I have just given, and in the claims which I am about to make, that I class and include the given husband and wife with their own ancestors.

Having thus described my invention what I claim as new and desire to secure by Letters Patent is:

1. A generation chart comprising a sheet having on its face a column provided with means indicating the generations in sequence, followed by numerals arranged in arithmetical progression beginning with the first generation, said means dividing said numerals into groups, the species of one sex being indicated by even numbers and the species of the opposite sex by odd numbers.

2. A table for symbols, names, dates and other descriptive genealogical data, consisting of parallel lines crossed by parallel columns; which table contains three series of numbers, each series being in column formation, and being spaced and located with reference to the lines, and to the other series, and being determined in its make up by the mathematical law needed all so that if the numbers falling on any line be arranged in order of magnitude the smaller number of any pair of numbers then adjacent to each other shall be half the greatest even number that is less than the greater number of the pair—all as described.

3. A table for symbols, names, dates and other descriptive genealogical data, consisting of parallel lines crossed by parallel columns; which table contains two series of numbers, each series being in column formation, and being spaced and located with reference to the lines, and to the other series, and being determined in its make up by the mathematical law needed, all so that the smaller of any two numbers that fall on any line is half the greatest even number intermediate in magnitude between the said two numbers,—for the purpose set forth and as described.

4. A chart of ancestors of a husband and wife which designates ancestors by names and also by numbers with the two designations combined in such manner that the number attached to the name of the child of any ancestor is half the greatest even number less than the number attached to the name of said ancestor.

WILLIAM WALLER CARSON.

Witnesses:
  CHARLES EDWARD FERRIS,
  CHARLES ALBERT PERKINS.